United States Patent
Kang et al.

(10) Patent No.: US 7,853,203 B2
(45) Date of Patent: Dec. 14, 2010

(54) METHOD AND SYSTEM FOR SELECTING A RELAY STATION IN A COMMUNICATION SYSTEM USING A MULTIHOP RELAY SCHEME

(75) Inventors: Hyun-Jeong Kang, Seoul (KR); Pan-Yuh Joo, Seoul (KR); Jung-Je Son, Seongnam-si (KR); Jae-Weon Cho, Suwon-si (KR); Hyoung-Kyu Lim, Seoul (KR); Yeong-Moon Son, Anyang-si (KR); Song-Nam Hong, Seoul (KR); Sung-Jin Lee, Suwon-si (KR); Mi-Hyun Lee, Seoul (KR); Young-Ho Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 905 days.

(21) Appl. No.: 11/645,962

(22) Filed: Dec. 27, 2006

(65) Prior Publication Data
US 2007/0149118 A1    Jun. 28, 2007

(30) Foreign Application Priority Data
Dec. 27, 2005    (KR)    ............. 10-2005-0130853

(51) Int. Cl.
*H04B 7/15* (2006.01)
(52) U.S. Cl. .............. 455/11.1; 455/7; 455/67.11; 375/132; 370/315
(58) Field of Classification Search ............... 455/16, 455/17, 9, 10, 11.1, 13.1, 513, 435, 22, 15, 455/452.1, 522, 560, 60, 62, 13.4, 512, 7, 455/67.11; 370/334, 335, 342, 318, 208, 370/329, 229, 315; 375/141, 214, 133, 132
See application file for complete search history.

(56) References Cited

U.S. PATENT DOCUMENTS

| | | | | |
|---|---|---|---|---|
| 4,941,200 A | * | 7/1990 | Leslie et al. | 455/17 |
| 5,115,514 A | * | 5/1992 | Leslie | 455/9 |
| 5,809,398 A | * | 9/1998 | Moberg et al. | 455/17 |
| 6,370,185 B1 | * | 4/2002 | Schmutz et al. | 375/214 |
| 6,684,058 B1 | * | 1/2004 | Karacaoglu et al. | 455/20 |
| 6,965,568 B1 | * | 11/2005 | Larsen | 370/238 |
| 7,054,292 B2 | * | 5/2006 | Hall et al. | 370/334 |
| 2001/0012776 A1 | * | 8/2001 | Chandler et al. | 455/435 |

(Continued)

FOREIGN PATENT DOCUMENTS

KR    1020000049754    8/2000

(Continued)

*Primary Examiner*—Tan Trinh
(74) *Attorney, Agent, or Firm*—The Farrell Law Firm, LLP

(57) ABSTRACT

A method and apparatus for selecting a Relay Station (RS) for a Mobile Station (MS) of a communication system are provided. The communication system is provided with the MS, a serving Base Station (BS) for providing the MS with a service and RSs for relaying signals of the MS and the BS. The MS receives RS information for increasing system capacity from the serving BS, measures reference signal strength of an RS indicated in the RS information, and selects an associated RS as a target RS for relaying a signal when the measured reference signal strength satisfies a condition.

20 Claims, 6 Drawing Sheets

U.S. PATENT DOCUMENTS

| | | |
|---|---|---|
| 2002/0028655 A1* | 3/2002 | Rosener et al. ............... 455/16 |
| 2003/0054813 A1* | 3/2003 | Riley et al. ................. 455/424 |
| 2003/0123401 A1* | 7/2003 | Dean ......................... 370/318 |
| 2003/0125067 A1* | 7/2003 | Takeda et al. ............... 455/522 |
| 2004/0176027 A1* | 9/2004 | O'Neill ......................... 455/7 |
| 2004/0192204 A1 | 9/2004 | Periyalwar et al. |
| 2005/0014464 A1* | 1/2005 | Larsson ..................... 455/11.1 |
| 2005/0053025 A1* | 3/2005 | Duffy et al. ................. 370/315 |
| 2006/0040616 A1* | 2/2006 | Wheatley ................. 455/67.11 |
| 2006/0074462 A1* | 4/2006 | Verhoef ........................ 607/60 |
| 2006/0209671 A1* | 9/2006 | Khan et al. ................. 370/208 |
| 2007/0178831 A1 | 8/2007 | Takeda et al. |
| 2007/0183321 A1* | 8/2007 | Takeda et al. ............... 370/229 |
| 2008/0260000 A1* | 10/2008 | Periyalwar et al. .......... 375/133 |
| 2009/0075587 A1* | 3/2009 | Yu et al. ......................... 455/7 |
| 2009/0103509 A1* | 4/2009 | Sanderford et al. ......... 370/343 |
| 2009/0270027 A1* | 10/2009 | O'Neill ....................... 455/15 |

FOREIGN PATENT DOCUMENTS

| | | |
|---|---|---|
| KR | 1020030091361 | 12/2003 |
| KR | 1020040018525 | 3/2004 |

* cited by examiner

METHOD AND SYSTEM FOR SELECTING A RELAY STATION IN A COMMUNICATION SYSTEM USING A MULTIHOP RELAY SCHEME

PRIORITY

This application claims priority under 35 U.S.C. §119 to an application filed in the Korean Intellectual Property Office on Dec. 27, 2005 and assigned Ser. No. 2005-130853, the contents of which are incorporated herein by reference.

BACKGROUND OF THE INVENTION

1. Field of the Invention

The present invention relates generally to a communication system using a multihop relay scheme, and more particularly to a method and system for selecting a relay station by a mobile station.

2. Description of the Related Art

Wireless mobile communication systems are currently evolving from Third-Generation (3G) to Fourth-Generation (4G) mobile communication systems. Research is being conducted to increase system capacity and extend a wireless transmission range, i.e., service coverage, in the 4G mobile communication systems. To do so, a multihop scheme has been proposed. When a channel state between a Base Station (BS) and a Mobile Station (MS) is poor, the multihop scheme can form a multihop relay path through a Relay Station (RS) by installing the RS between the BS and the MS. The MS can receive a radio channel having a good state through the multihop relay path. Further, when the multihop relay scheme is used for the MS located inside/outside a cell boundary at which a channel state is poor, the MS can receive a data channel at a higher rate and can extend cell service coverage in terms of the system.

FIG. 1 illustrates a communication system using the conventional multihop relay scheme.

Referring to FIG. 1, the multihop relay communication system has a multicell structure including a cell 100 covered by a BS 110, a cell 140 covered by a BS 150, a cell 130 covered by an RS 120 and a cell 170 covered by an RS 160. Multiple MSs are present in the cells 100, 130, 140 and 170. Herein, the RSs 120 and 160 can be located inside/outside the cell areas of the BSs 110 and 150 and can relay signals of the BSs 110 and 150 to MSs 121, 123, 161 and 163. If an area in which a signal of an RS such as the RS 160 can be received partially overlaps with a cell area of a specific BS even when the RS is not located inside the cell area of the specific BS, the RS can receive a signal of the specific BS.

As described above, an RS can relay a signal between a BS and an MS located outside the cell area of the BS to extend the cell coverage or can relay the signal between a BS and an MS located inside the cell area of the BS to increase the system capacity. That is, the RS not only can relay a signal of the MS located outside the cell area, but also can relay a signal of the MS located inside the cell area, thereby increasing the system capacity. Thus, the MS should be able to select the proper RS to extend cell coverage and increase system capacity.

SUMMARY OF THE INVENTION

It is, therefore, an object of the present invention to provide a method and system in which an MS receives RS information and selects an RS to increase system capacity in a communication system using a multihop relay scheme.

In accordance with the present invention, there is provided a method for selecting an RS by an MS of a communication system provided with the MS, a serving BS for providing the MS with a service and RSs for relaying signals of the MS and the BS, including receiving RS information for increasing system capacity from the serving BS, measuring reference signal strength of an RS indicated in the RS information, and selecting an associated RS as a target RS for relaying a signal when the measured reference signal strength satisfies a condition.

In accordance with the present invention, there is provided a signal transmission method for selecting an RS by a serving BS cell area of a communication system provided with the MS, the serving BS for providing the MS with a service and RSs for relaying signals of the MS and the BS, including detecting the number of RSs for increasing system capacity, and providing the MS with a message by generating the message including identifier information and preamble index information of each RS mapped to the detected number of RSs.

In accordance with the present invention, there is provided a method for selecting an RS by an MS of a communication system provided with the MS, a serving BS for providing the MS with a service and RSs for relaying signals of the MS and the BS, including receiving a message including first RS information for increasing system capacity and second RS information for extending cell coverage, extracting only the first RS information from the message when the MS selects a target RS for increasing the system capacity, measuring reference signal strength of an RS indicated in the extracted first RS information, and selecting an associated RS as the target RS for relaying a signal when the measured reference signal strength satisfies a condition.

In accordance with the present invention, there is provided a communication system for selecting an RS, including an MS and a serving BS for providing the MS with a service, wherein the serving BS provides the MS with RS information for increasing system capacity, and the MS receives the RS information, measures reference signal strength of an RS indicated in the RS information, and selects an associated RS as a target RS for relaying a signal when the measured reference signal strength satisfies a condition.

In accordance with the present invention, there is provided a communication system for selecting an RS, including an MS and a serving BS for providing the MS with a service, wherein the serving BS provides the MS with a message including first RS information for increasing system capacity and second RS information for extending cell coverage, and the MS receives the message, extracts only the first RS information from the message when selecting a target RS for increasing the system capacity, measures reference signal strength of an RS indicated in the extracted first RS information, and selects an associated RS as the target RS for relaying a signal when the measured reference signal strength satisfies a condition.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. In the following description, detailed descriptions of functions and configurations incorporated herein that are well known to those skilled in the art are omitted for the sake of clarity and conciseness.

The present invention discloses a method and system in which an MS receives Relay Station INFOrmation (RS-INFO) and selects an RS in a communication system using a multihop relay scheme. The RS-INFO is used to extend cell coverage and/or increase system capacity.

Figure 1:
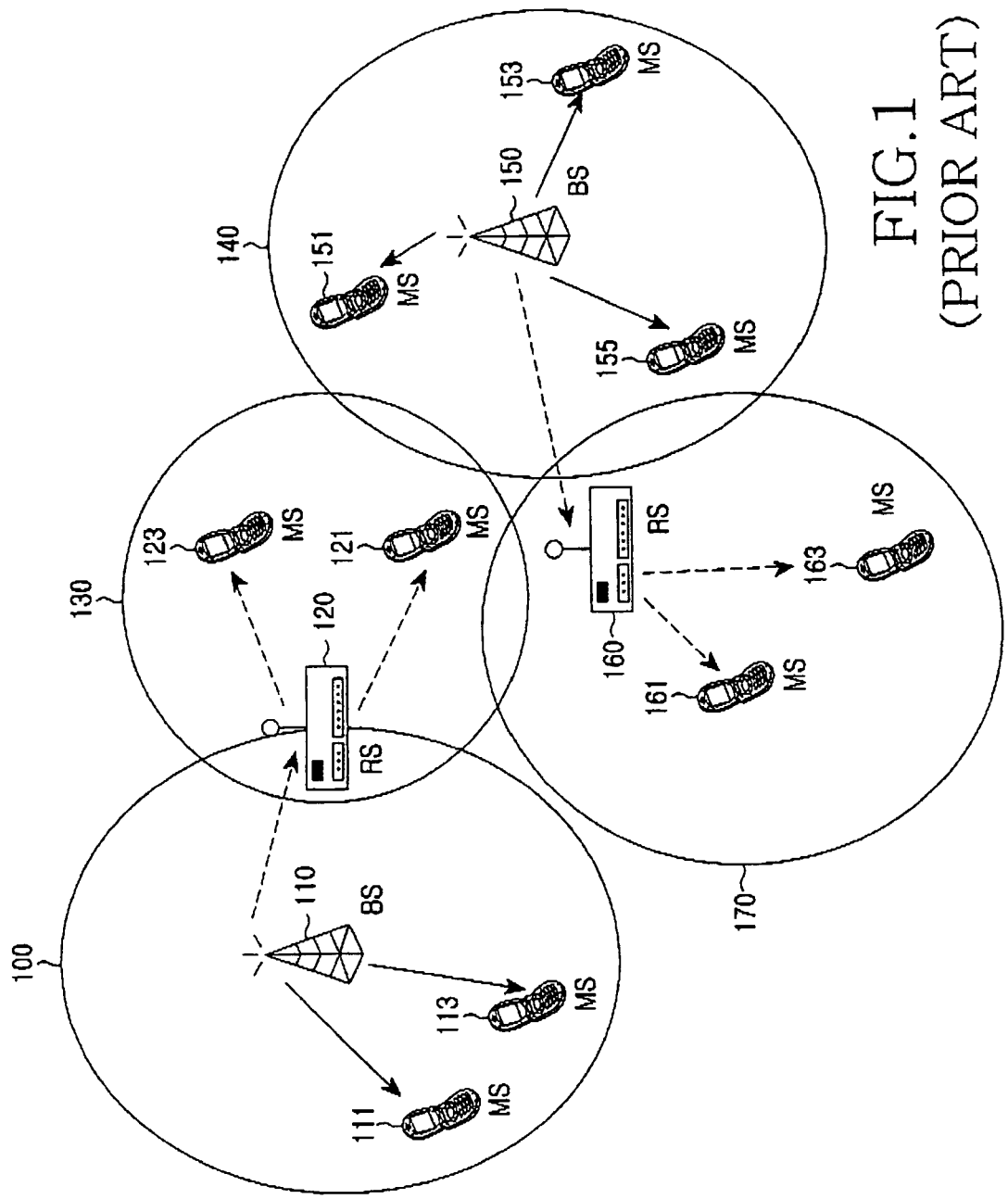
FIG. 1 illustrates a communication system using a conventional multihop relay scheme.

For this, a BS broadcasts the RS-INFO message to all nodes located inside its cell area. Herein, the nodes include all nodes in which a relay function is performed or not performed. Further, it is noted that a signal of the BS can be received even when a node is located outside a cell area such as the RS 160 of FIG. 1. A node for performing the relay function is an RS. The RS may be an infrastructure of a system or a client RS serving as a specific node for performing the relay function. Further, the RS may be a fixed RS without mobility, a nomadic RS in which moving and settling are repeated, or a mobile RS.

Figure 2:
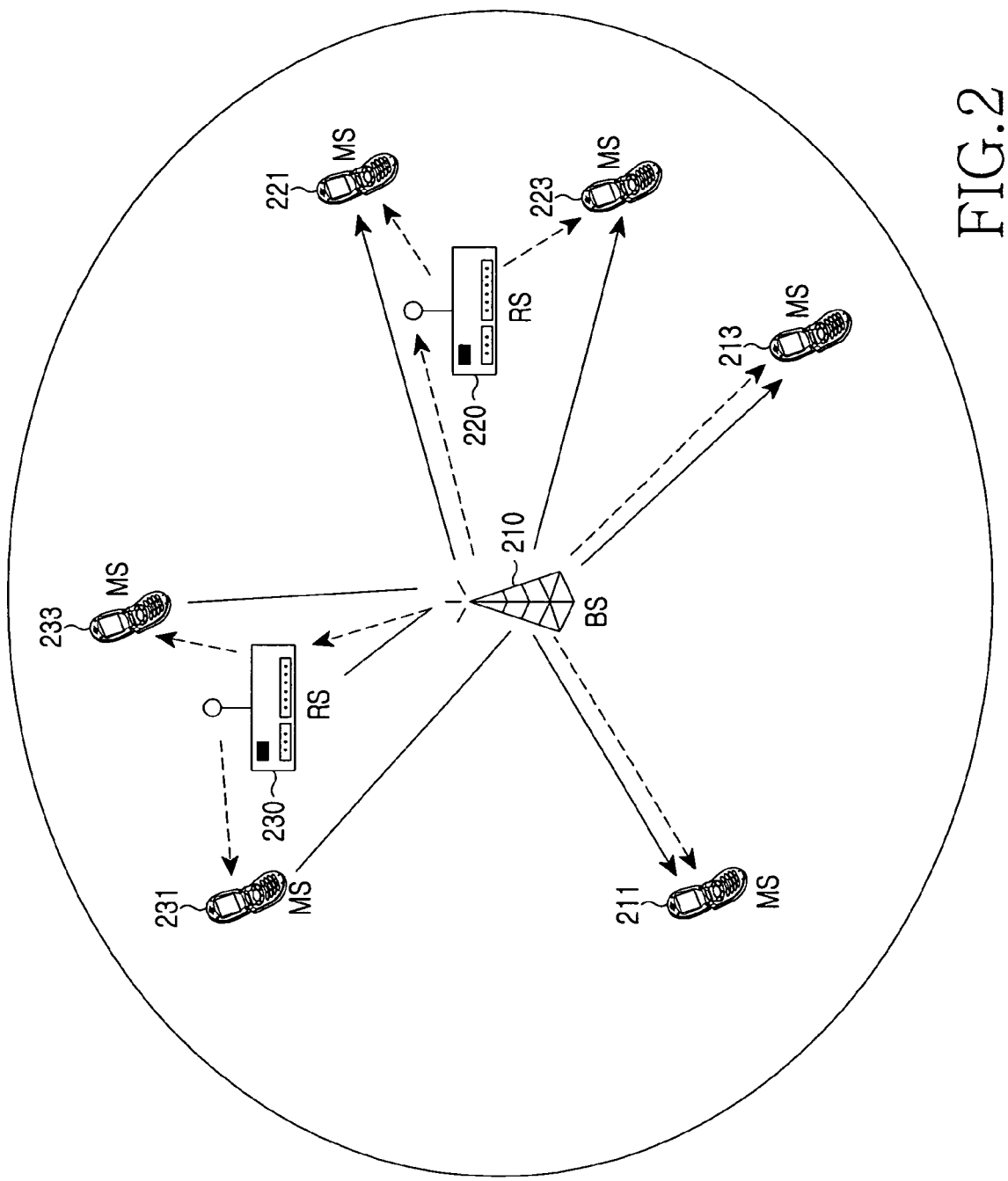
FIG. 2 illustrates a communication system using a multihop relay scheme in which a BS transmits signals to and receives signals from an RS and an MS in accordance with the present invention.

FIG. 2 illustrates the communication system using the multihop relay scheme in which a BS transmits signals to and receives signals from an RS and an MS in accordance with the present invention.

Referring to FIG. 2, the system includes a BS 210, multiple MSs 211, 213, 221, 223, 231 and 233, and RSs 220 and 230 for performing relay functions.

The MSs 211, 213, 221, 223, 231 and 233 can directly transmit signals to and receive signals from the BS 210, and can transmit signals to and receive signals from the BS 210 using the relay functions of the RSs 220 and 230.

If an arbitrary MS is located at a cell edge of the BS 210 which has a poor channel state, the RSs 220 and 230 relay signals, thereby improving the poor channel state. The RSs provide the MS with a high-speed stable data transmission path, thereby increasing a valid signal transmission rate and system capacity.

Figure 3:
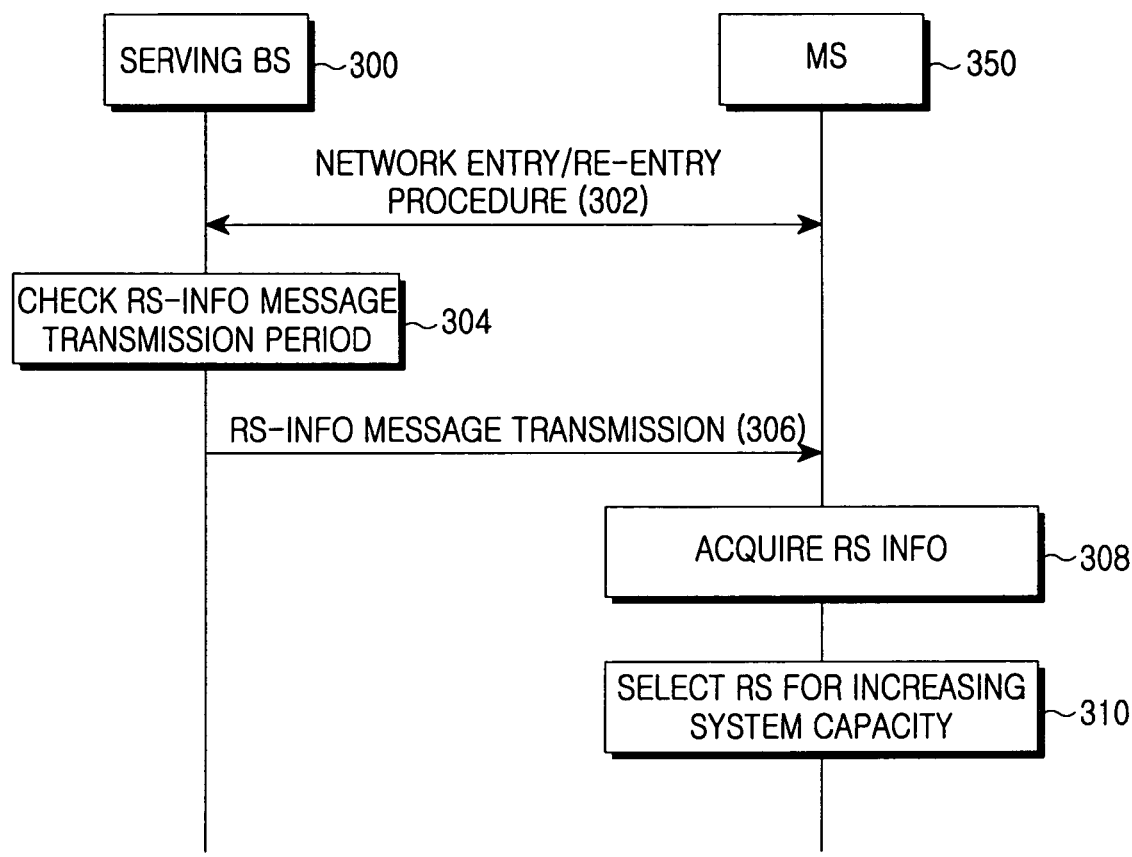
FIG. 3 illustrates a process for selecting an RS for an MS that can increase system capacity in the communication system using the multihop relay scheme in accordance with a first embodiment of the present invention.

FIG. 3 illustrates a process for selecting an RS in an MS that can increase system capacity in the communication system using the multihop relay scheme in accordance with a first embodiment of the present invention.

Referring to FIG. 3, an MS 350 can directly communicate with a serving BS 300 by performing a network entry or re-entry procedure with the serving BS 300 (step 302).

The serving BS 300 collects information about an RS located inside its cell area. Herein, the information is used to increase the system capacity, and can be an RS IDentifier (RSID) and a preamble index among information elements constructing a first format RS-INFO message as shown below in Table 1. The serving BS 300 should know in advance whether the RS is designed to increase the system capacity or to extend the cell coverage.

The serving BS 300 checks a transmission period of the RS-INFO message containing the collected information (step 304). If a period in which the RS-INFO message is transmitted is reached, the serving BS 300 broadcasts the RS-INFO message to the MS 350 (step 306).

The MS 350 acquires RS-INFO by receiving the RS-INFO message (step 308). Thus, the MS 350 measures the strength of a preamble signal of at least one RS using the RS-INFO and selects an RS with a highest signal strength value as a target RS for relaying a signal of the BS (step 310). The MS 350 compares the signal strength of the serving BS 300 with that of the selected RS. When the signal strength of the RS is higher, relay communication is performed using the RS. Further, the MS 350 can select an RS having a signal strength that is equal to or greater than a reference signal strength as the target RS for performing the relay function.

The RS-INFO message is to be broadcast and also can be received by not only the MS 350 but also RSs. Thus, the RSs receive the RS-INFO message and can use information contained in the message. For example, in a system considering relay communication of at least two hops, the RSs can select other RSs for relaying a signal of the BS through a procedure for acquiring information about a neighbor RS from the received RS-INFO message and measuring the preamble signal strength of the neighbor RS.

Table 1 shows the first format RS-INFO message in accordance with the first embodiment of the present invention.

TABLE 1

| Syntax | Size | Notes |
|---|---|---|
| RS INFO message format( ) { | | |
| Management Message Type=TBD | 8 bits | To be determined |
| N_Type2_RS | 8 bits | The count of the unique type 2 RS information |
| For(i=0; i<N_Type2_RS; i++) { | | |
| RSID | 48 bits | ID of type 2 RS in serving cell |
| Preamble index | TBD | |
| } | | |
| } | | |

As shown in Table 1, the RS-INFO message includes a "management message type" field for indicating a type of message to be transmitted, an "N_Type'2_RS" field for indicating the number of RSs for increasing system capacity, an "RSID" field for indicating IDs of the RSs, and a "preamble index" field for indicating preamble indices of the RSs. Herein, preambles used by the RSs can use a preamble of a serving BS without modification. An unique preamble can be used for each RS.

Figure 4:
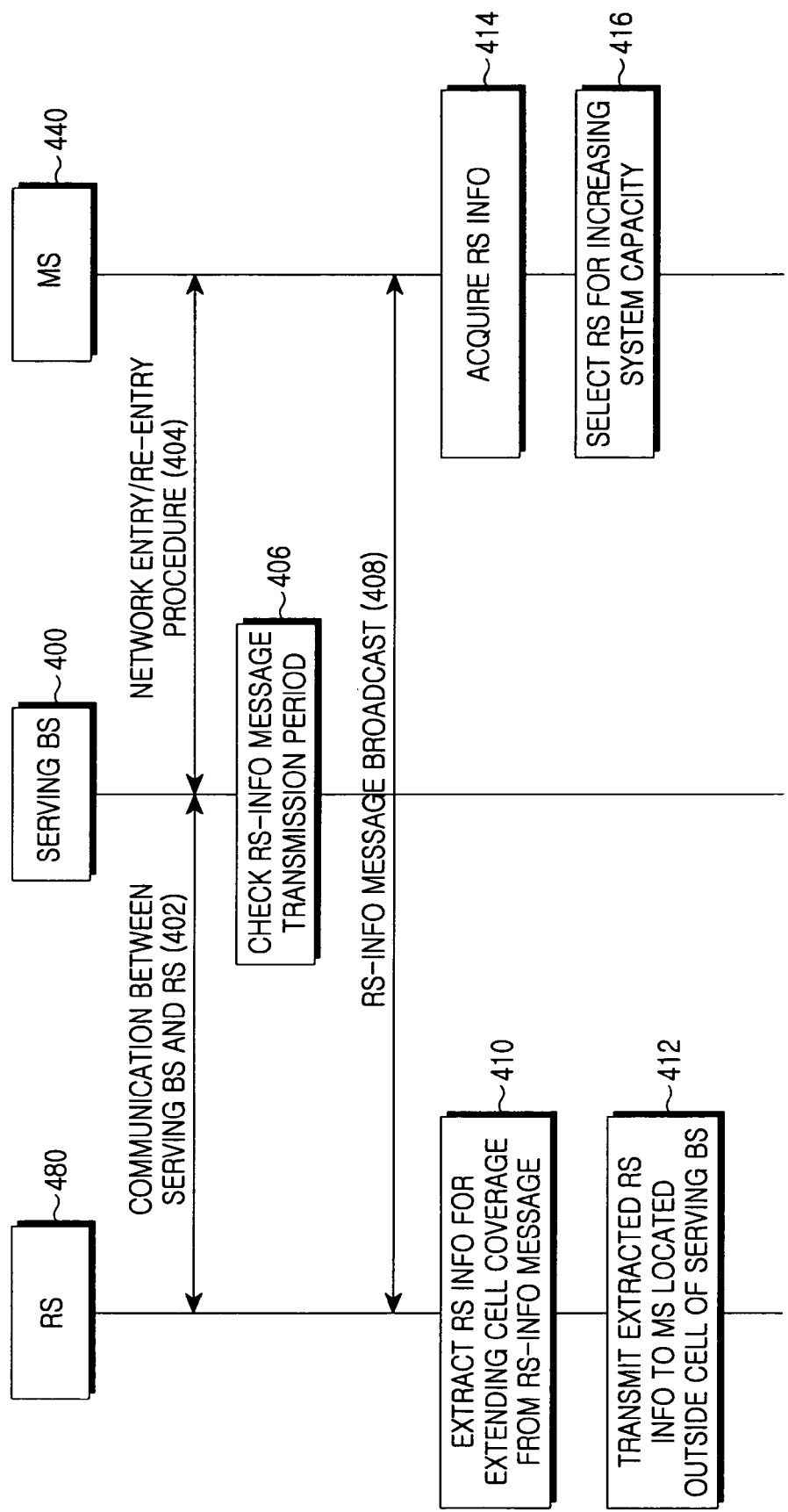
FIG. 4 illustrates a process for selecting an RS for an MS that can increase system capacity in the communication system using the multihop relay scheme in accordance with a second embodiment of the present invention.

FIG. 4 illustrates a process for selecting an RS in an MS that can increase system capacity in the communication system using the multihop relay scheme in accordance with a second embodiment of the present invention.

Referring to FIG. 4, an RS 480 can perform multihop communication or direct communication with a serving BS 400 (step 402). An MS 440 can directly communicate with the serving BS 400 through a network entry or re-entry procedure (step 404). Herein, the RS 480 transmits a signal to and receives a signal from an MS located outside a cell area of the serving BS 400.

The serving BS 400 collects information about an RS located inside its cell area. Herein, the information includes information for both increasing system capacity and extending cell coverage, which is different from that of the first embodiment. As shown below in Table 2, a second format RS-INFO message contains the above-described information.

The serving BS 400 checks a transmission period of the RS-INFO message containing the collected information (step 406). If a period in which the RS-INFO message is transmitted to the MS 440 and the RS 480 is reached, the serving BS 400 broadcasts the RS-INFO message to the MS 440 and the RS 480 (step 408).

Table 2 shows the second format RS-INFO message in accordance with the second embodiment of the present invention.

TABLE 2

| Syntax | Size (bits) | Notes |
|---|---|---|
| ServingRS INFO message format( ) { | | |
| Management Message Type=TBD | 8 | TBD(To be determined) |
| N_Type2_RS | 8 | The count of the unique type 2 RS information |
| For(i=0; i<N_Type2_RS; i++) { | | |
|   RSID | 48 | ID of type 2 RS in serving cell |
|   Preamble index | TBD | |
| } | | |
| N_Type1_NRS | 8 | The count of the unique RS information |
| For(j=0; j<N_NRS; j++) { | | |
|   RSID | 48 | ID of neighbor RS |
|   Preamble Index | 8 (TBD) | |
|   RS PHY Profile ID | 8 | Aggregated IDs of Co-located FA Indicator, FA Configuration Indicator, RS EIRP Indicator, DCD/UCD Reference Indicator, RS FA Index Indicator, Trigger Reference Indicator |
|   If(RS FA Index Indicator==1) { | | |
|     RS FA Index | 8 | This field, Frequency Assignment Index, is present only the RS FA Index Indicator in RS PHY Profile ID is set. Otherwise, the neighbor RS has the same FA Index as the serving RS. |
|   } | | |
|   If(RS EIRP Indicator==1) { | | |
|     RS EIRP | 8 | Signed Integer from −128 to 127 in unit of dBm. This field is present only if the RS EIRP Indicator is set in RS PHY Profile ID. Otherwise, the neighbor RS has the same EIRP as the serving RS. |
|   } | | |
|   RS DCD Configuration Change Count | 4 | This represents the 4 LSBs of the RS current DCD configuration change count. |
|   RS UCD Configuration Change Count | 4 | This represents the 4 LSBs of the RS current UCD configuration change count. |
|   TLV Encoded RS Information | Variable | TLV specific |
| } | | |
| } | | |

As shown in Table 2, the RS-INFO message can be divided into an "N_Type 1_NRS" field for indicating the number of RSs for extending cell coverage, information fields related to the "N_Type 1_NRS" field, an "N_Type 2_RS" field for indicating the number of RSs for increasing system capacity, and information fields related to the "N_Type 2_RS" field. The "N_Type 2_RS" field and its related information fields are shown in Table 1 and therefore its description is omitted here.

The "N_Type 1_NRS" field and its related information fields are required when MSs located outside the cell area of the serving BS 400 select RSs. The information includes, for example, the number of RSs for supporting the cell coverage extension, RSID information, a preamble index of each RS, information required to acquire synchronization with each RS, Effective Isotropic Radiated Power (EIRP) information related to each RS and Type/Length/Value (TLV) information related to each RS. The EIRP indicates the strength of transmission power in a Radio Frequency (RF) stage.

Thus, when receiving the RS-INFO message from the serving BS 400, the RS 480 extracts RS INFO for extending the cell coverage contained in the RS-INFO message (step 410). That is, the RS 480 discards the "N_Type 2_RS" field and its related information fields and extracts only the "N_Type 1_NRS" field and its related information fields. The RS 480 transmits the extracted RS INFO to the MS located outside the cell area of the serving BS 400 (step 412).

The MS 440 receives the RS-INFO message from the serving BS 400, extracts only the "N_Type 2_RS" field and its related information fields and discards the "N_Type 1_NRS" field and its related information elements (step 414). Using the extracted information, the MS 440 measures the strength of a preamble signal of at least one RS and selects an RS with a highest signal strength value as a target RS for performing a relay function with the BS (step 416). The MS 440 compares the signal strength of the serving BS 400 with that of the selected RS. When the signal strength of the RS is higher, relay communication is performed using the RS.

Figure 5:
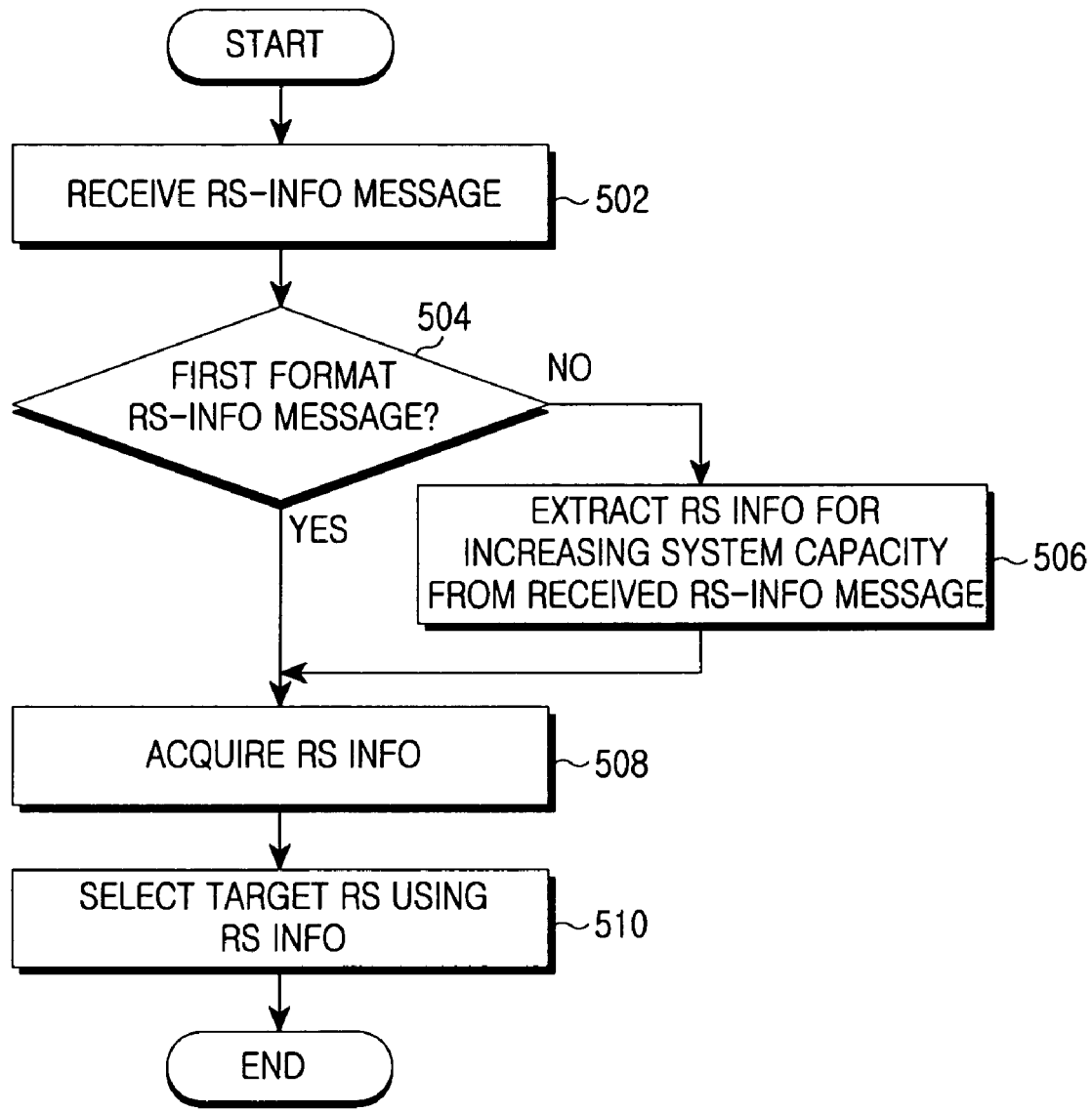
FIG. 5 illustrates a process for selecting an RS for an MS in the communication system using the multihop relay scheme in accordance with the present invention.

FIG. 5 illustrates a process for selecting an RS for an MS in the communication system using the multihop relay scheme in accordance with exemplary embodiments of the present invention.

In FIG. 5, the MS can directly communicate with a serving BS since it is located inside a cell area of the serving BS. However, the MS can use relay communication rather than direct communication with the BS when a channel state is less than a threshold level. For this, the MS should select an RS for the relay communication.

Referring to FIG. 5, the MS receives an RS-INFO message from the serving BS in step 502 and then proceeds to step 504. In step 504, the MS determines whether the received RS-INFO message is a first format RS-INFO message only containing RS INFO for increasing system capacity. If the received RS-INFO message is determined to be the first format RS-INFO message, the MS proceeds to step 508. However, if the received RS-INFO message is a second format RS-INFO message containing both information for increasing system capacity and information for extending cell coverage, the MS proceeds to step 506.

The MS extracts only RS INFO for increasing the system capacity from the received RS-INFO message, i.e., the second format RS-INFO message, in step 506 and then proceeds to step 508. The MS acquires the RS INFO extracted from the first or second format RS-INFO message in step 508 and proceeds to step 510. In this case, the RS-INFO has the format as shown in Table 1. In step 510, the MS selects an RS with the highest preamble signal strength as a target RS for performing a relay function when transmitting a signal to and receiving a signal from the serving BS.

Figure 6:
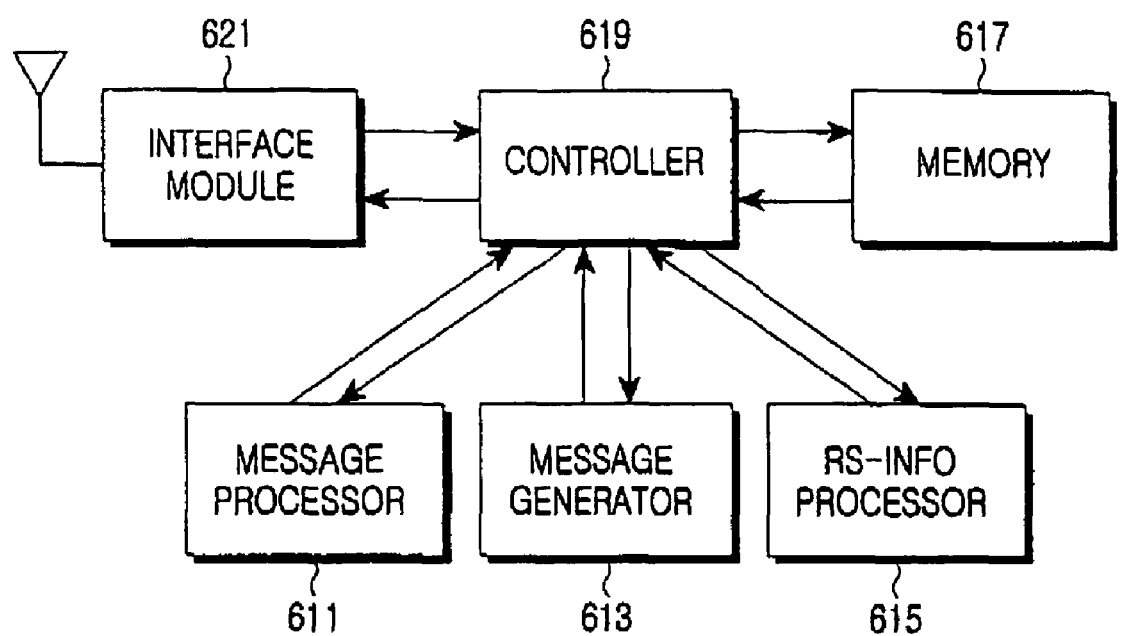
FIG. 6 illustrates a structure of an MS (or RS or BS) in accordance with the present invention.

FIG. 6 illustrates a structure of the MS (or RS or BS) in accordance with the present invention.

Referring to FIG. 6, the MS includes a message processor 611, a message generator 613, an RS-INFO processor 615, a memory 617, a controller 619 and an interface module 621.

The controller 619 controls the overall operation of the MS. For example, the controller 619 controls an operation for processing and controlling voice and data communication and an operation for processing RS INFO for increasing system capacity. That is, the controller 619 provides the message processor 611 with an RS-INFO message received from a serving BS, receives a message to be transmitted to the serving BS from the message generator 613 and provides the interface module 621 with the received message.

The message processor 611 interprets a control message received from the RS or BS and then reports an interpretation result to the controller 619. That is, when the MS receives the RS-INFO message as shown in Tables 1 and 2, the message processor 611 extracts various information elements contained in the message and provides the controller 619 with the extracted information. The controller 619 controls the RS-INFO processor 615 on the basis of the information input from the message processor 611.

The message generator 613 generates a message to be transmitted to the RS or BS under control of the controller 619. The message generated from the message generator 613 is output to the interface module 621 through the controller 619.

The RS-INFO processor 615 provides the controller 619 with a signal for performing a communication procedure using RS INFO for increasing system capacity under the control of the controller 619.

The memory 617 stores a program for controlling the overall operation of the MS and stores a message and temporary data generated in operation of the program.

The interface module 621 communicates with the RS or BS, and includes an RF processor and a baseband processor. The RF processor converts a signal received through an antenna into a baseband signal and then provides the baseband processor with the baseband signal. The RF processor converts a baseband signal received from the baseband processor into an RF signal to be transmitted over the air and then transmits the RF signal through the antenna. For example, when the communication system uses an Orthogonal Frequency Division Multiplexing (OFDM) or Orthogonal Frequency Division Multiple Access (OFDMA) scheme, the baseband processor provides the control section 619 with original information/data by performing a Fast Fourier Transform (FFT) process and a channel decoding process for the signal from the RF processor. In contrast, the baseband processor performs a channel encoding process and an Inverse Fast Fourier Transform (IFFT) process for data from the control section 619 and then provides the RF processor with the processed data.

As described above, the present invention discloses a scheme in which an MS receives RS INFO from a serving BS and selects an RS using the received RS INFO. However, the RS can be selected by the serving BS rather than the MS. That is, the serving BS can select the RS for the MS by considering RS-by-RS Channel Quality Information (CQI) reported from the MS.

As is apparent from the above description, the present invention can increase system capacity when a BS transmits RS INFO to an MS and the MS performs multihop relay communication with the BS through an RS with a good channel state.

Although the preferred embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for selecting a Relay Station (RS) by a Mobile Station (MS) of a communication system provided with the MS, a serving Base Station (BS) for providing the MS with a service and RSs for relaying signals of the MS and the BS, comprising the steps of:

receiving, from the serving BS, RS information for increasing system capacity;

measuring strength of a reference signal received from an RS indicated in the RS information; and selecting the RS as a target RS for relaying a signal when the measured reference signal strength satisfies a condition.

2. The method of claim 1, wherein the condition is satisfied when the measured reference signal strength is equal to or greater than a reference signal strength value.

3. The method of claim 1, wherein the condition is satisfied when the measured reference signal strength is equal to or greater than reference signal strength of the serving BS.

4. The method of claim 1, wherein the RS information includes at least one of information elements about a number of RSs for increasing the system capacity, an RS identifier, and a preamble index.

5. The method of claim 4, wherein the preamble index is identical to a preamble index used in the serving BS.

6. A signal transmission method for selecting a Relay Station (RS) of a Mobile Station (MS) in a serving Base Station (BS) cell area of a communication system provided with the MS, the serving BS for providing the MS with a service and RSs for relaying signals of the MS and the BS, comprising the steps of:

detecting the number of RSs for increasing system capacity; and providing the MS with a message by generating the message including identifier information and preamble index information of each RS mapped to the detected number of RSs.

7. A method for selecting a Relay Station (RS) for a Mobile Station (MS) of a communication system provided with the MS, a serving Base Station (BS) for providing the MS with a service and RSs for relaying signals of the MS and the BS, comprising the steps of:

receiving a message including first RS information for increasing system capacity and second RS information for extending cell coverage;

extracting only the first RS information from the message when the MS selects a target RS for increasing the system capacity;

measuring reference signal strength of an RS indicated in the extracted first RS information; and selecting the RS as the target RS for relaying a signal when the measured reference signal strength satisfies a condition.

8. The method of claim 7, wherein the condition is satisfied when the measured reference signal strength is equal to or greater than a reference signal strength value.

9. The method of claim 7, wherein the condition is satisfied when the measured reference signal strength is equal to or greater than reference signal strength of the serving BS.

10. The method of claim 7, wherein the first RS information includes at least one of information elements about a number of RSs for increasing the system capacity, an RS identifier, and a preamble index.

11. A signal transmission method for selecting a Relay Station (RS) in a serving Base Station (BS) cell area of a communication system provided with a Mobile Station (MS), the serving BS for providing the MS with a service and RSs for relaying signals of the MS and the BS, comprising the steps on detecting the number of first RSs for increasing system capacity and a number of second RSs for extending cell coverage; and providing the MS with a message by generating the message including first RS information having an identifier and a preamble index of each first RS mapped to the detected number of first RSs and second RS information having an identifier, a preamble index, an RS physical profile identifier, and a frequency index of each second RS mapped to the detected number of second RSs.

12. A communication system for selecting a Relay Station (RS), comprising:

a Mobile Station (MS); and a serving Base Station (BS) for providing the MS with a service, wherein the serving BS provides the MS with RS information for increasing system capacity, and the MS receives the RS information, measures reference signal strength of an RS indicated in the RS information, and selects the RS as a target RS for relaying a signal when the measured reference signal strength satisfies a condition.

13. The communication system of claim 12, wherein the condition is satisfied when the measured reference signal strength is equal to or greater than a reference signal strength value.

14. The communication system of claim 12, wherein the condition is satisfied when the measured reference signal strength is equal to or greater than a reference signal strength of the serving BS.

15. The communication system of claim 12, wherein the RS information includes at least one of information elements about a number of RSs for increasing the system capacity, an RS identifier, and a preamble index.

16. The communication system of claim 15, wherein the preamble index is identical to a preamble index used in the serving BS.

17. A communication system for selecting a Relay Station (RS), comprising:

a Mobile Station (MS); and a serving Base Station (BS) for providing the MS with a service, wherein the serving BS provides the MS with a message including first RS information for increasing system capacity and second RS information for extending cell coverage, and the MS receives the message, extracts only the first RS information from the message when selecting a target RS for increasing the system capacity, measures reference signal strength of an RS indicated in the extracted first RS information, and selects the RS as the target RS for relaying a signal when the measured reference signal strength satisfies a condition.

18. The communication system of claim 17, wherein the condition is satisfied when the measured reference signal strength is equal to or greater than a reference signal strength value.

19. The communication system of claim 17, wherein the condition is satisfied when the measured reference signal strength is equal to or greater than a reference signal strength of the serving BS.

20. The communication system of claim 17, wherein the first RS information includes at least one of information elements about a number of RSs for increasing the system capacity, an RS identifier, and a preamble index.

* * * * *